United States Patent [19]
Takahashi et al.

[11] Patent Number: 5,560,880
[45] Date of Patent: Oct. 1, 1996

[54] RECORDING DISC AND METHOD OF PRODUCING SAME

[75] Inventors: Kenji Takahashi, Miyagi; Kazuya Ogawa, Nugata, both of Japan

[73] Assignee: Sony Corporation, Tokyo, Japan

[21] Appl. No.: 415,440

[22] Filed: Apr. 3, 1995

Related U.S. Application Data

[62] Division of Ser. No. 233,323, Apr. 26, 1994.

[30] Foreign Application Priority Data

Apr. 27, 1993 [JP] Japan ................................. 5-100607

[51] Int. Cl.$^6$ .......................... B29C 45/04; G11B 23/00
[52] U.S. Cl. .......................... 264/251; 369/290; 369/291; 264/255; 264/328.8
[58] Field of Search .................. 369/290, 291, 369/271; 360/133, 135; 428/65.3, 66.6, 694 R; 430/945; 264/251, 255, 328.1, 328.8; 29/DIG. 29, DIG. 28, 527.4

[56] References Cited

U.S. PATENT DOCUMENTS

| | | | |
|---|---|---|---|
| 4,743,994 | 5/1988 | Kato et al. | 360/133 |
| 4,785,444 | 11/1988 | Nakane et al. | 369/290 |
| 4,787,009 | 11/1988 | Takahashi | 369/290 |
| 4,926,410 | 5/1990 | Suzuki et al. | 369/290 |
| 5,020,207 | 6/1991 | Minoda et al. | 369/270 |
| 5,226,033 | 7/1993 | Takahashi | 369/290 |
| 5,289,456 | 2/1994 | Takahashi | 369/290 |
| 5,448,553 | 9/1995 | Suzuki et al. | 369/290 |

FOREIGN PATENT DOCUMENTS

| | | | |
|---|---|---|---|
| 62-250571 | 10/1987 | Japan | 360/133 |
| 63-89314 | 4/1988 | Japan . | |
| 63-292475 | 11/1988 | Japan . | |
| 2127206 | 4/1984 | United Kingdom | 360/135 |

Primary Examiner—Stuart S. Levy
Assistant Examiner—David L. Ometz
Attorney, Agent, or Firm—Jay H. Maioli

[57] ABSTRACT

A chucking hub member welded to a disc substrate includes a circular metal plate, an outer plastic ring molded on and around an outer peripheral portion of the metal plate, and an inner plastic ring molded on and around a peripheral portion of a circular center opening of the metal plate. The outer and inner plastic rings are produced by injecting melted plastic into both a first cavity portion defined about the outer peripheral portion of the metal plate and a second cavity portion defined about the peripheral portion of the circular center opening of the metal plate. The first and second cavity portions have respective inlet openings which face toward the same direction.

4 Claims, 7 Drawing Sheets

RECORDING DISC AND METHOD OF PRODUCING SAME

This is a division of application Ser. No. 08/233,323 filed Apr. 26, 1994.

BACKGROUND OF THE INVENTION

1. Field of the Invention

The present invention relates in general to recording mediums, such as an optical recording disc, an optical reproducing disc and the like and methods of producing the same. More particularly, the present invention relates to a method of molding a chucking hub member which is installed at a center portion of a disc substrate.

2. Description of the Prior Art

Hitherto, optical discs, such as a magneto-optical disc and the like are known as a recording medium on which various information signals can be recorded.

As one of drive devices for driving the optical discs, there has been widely used a type which employs a magnetic clamp system for achieving reduction in thickness of the device. The magnetic clamp system comprises generally a magnet mounted on a turn table of the disc drive device and a magnetic metal plate mounted to the optical disc. In use, the optical disc is put on the turn table and turned together with the same. Due to work of the magnetic force produced by the magnet, the optical disc is tightly attached to the turn table. The optical disc is constructed of a plastic, such as a polycarbonate or the like and provided at its center with a plastic chucking hub member which has the magnetic metal plate secured thereto. The plastic chucking hub member is welded to the disc by means of a ultrasonic welding.

One of the optical discs of this type is shown in U.S. Pat. No. 5,226,033, which will be described in the following to clarify the present invention.

FIGS. 1 to 4 of the accompanying drawings show the conventional optical disc.

Figure 1:
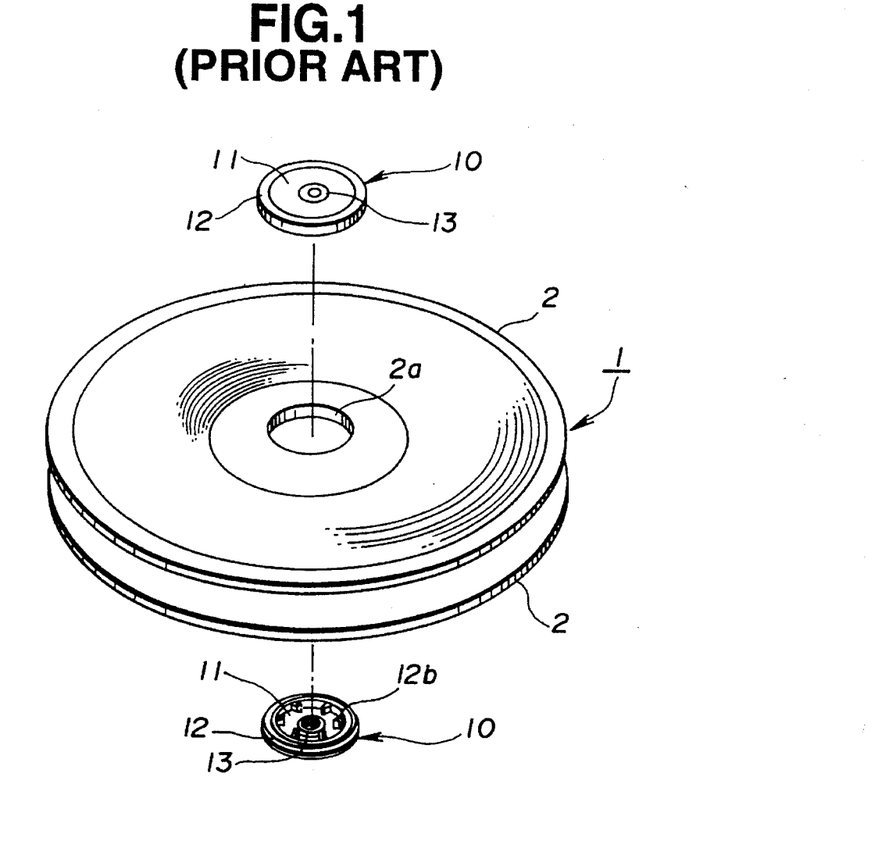
FIG. 1 is an exploded view of an optical disc having a chucking hub member which is produced by a conventional method.

In FIG. 1, denoted by numeral 1 is an optical disc which has both surfaces each being capable of recording and reproducing information signals. In fact, the disc 1 comprises two identical disc substrates 2 and 2 which are bonded at opposing surfaces thereof. The disc 1 is rotatably received in a cartridge (not shown).

Each disc substrate 2 is constructed of a plastic such as a polycarbonate or the like and has a center opening 2a. A chucking hub member 10 having a plastic portion is welded to the bored center portion 2a of the disc substrate 2 by means of a ultrasonic welding.

Figure 2:
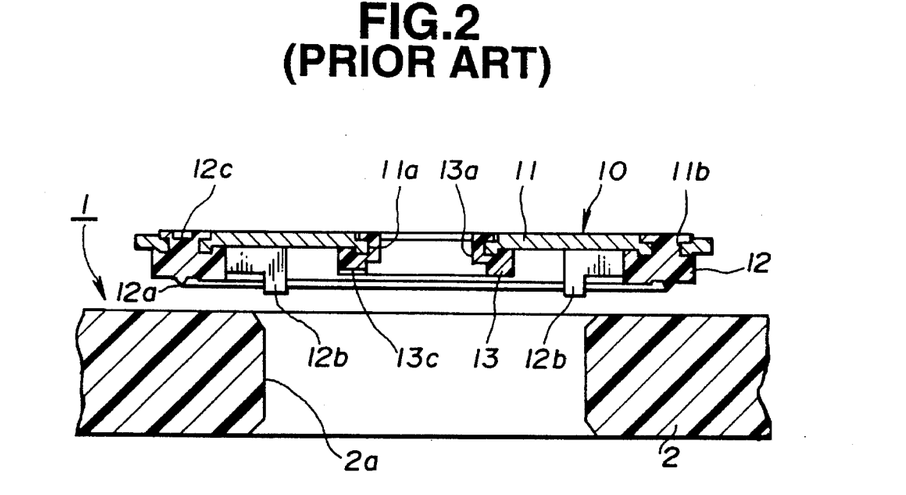
FIG. 2 is an enlarged sectional view of a center portion of the optical disc of FIG. 1 with the chucking hub member separated from a disc substrate.
Figure 3:
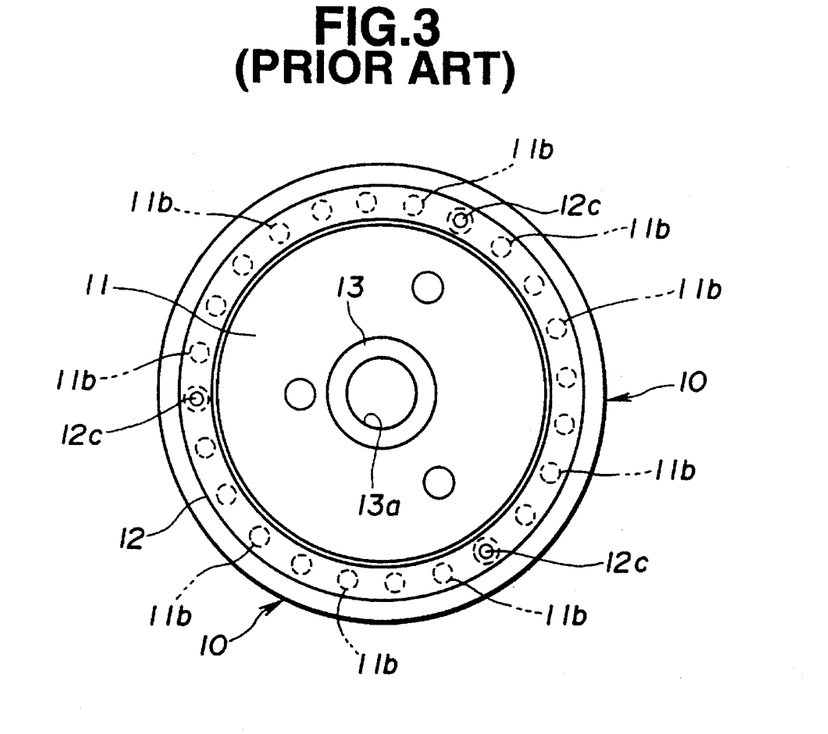
FIG. 3 is a plan view of the conventional chucking hub member.

As is seen from FIG. 2, the chucking hub member 10 comprises an outer plastic ring 12, an inner plastic ring 13 and a circular magnetic metal plate 11 which is integrally molded with the outer and inner plastic rings 12 and 13. The metal plate 11 may be constructed of iron. The metal plate 11 is formed with a center opening 11a. A so-called "outsert molding method" is used for integrally molding the outer plastic ring 12 around the outer periphery of the metal plate 11. The outer plastic ring 12 has a plurality of portions which pass through openings 11b formed in the peripheral portion of the metal plate 11. With this molding method, the circular metal plate 11 is mounted on an outside annular surface of the outer plastic ring 12, as is understood from FIG. 2.

Figure 4:
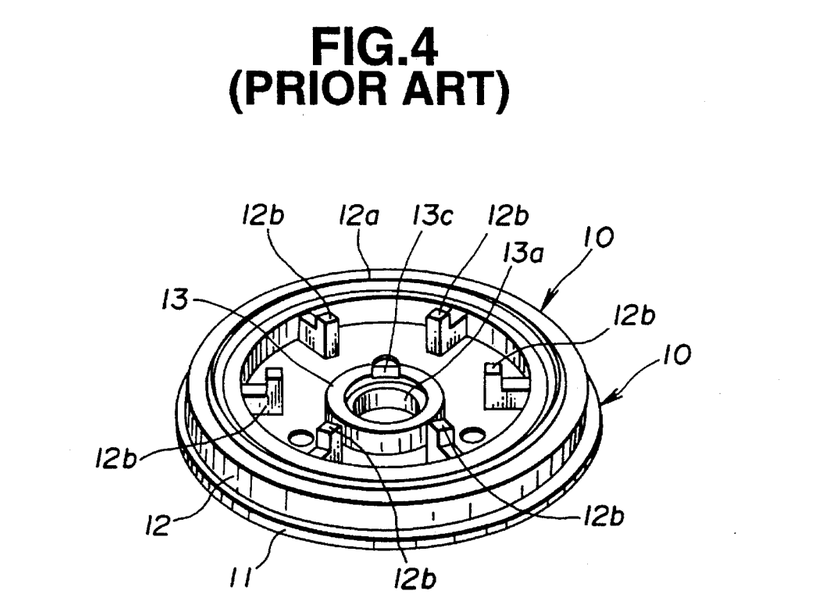
FIG. 4 is a perspective view of the conventional chucking hub member which is turned over.

As is seen from FIG. 4 which shows the chucking hub member 10 turned over, the outer plastic ring 12 is formed at an inside annular surface with a circular ridge 12a and at its inner wall with a plurality of guide ribs 12b each having a head projected away from the metal plate 11 (see FIG. 2). The guide ribs 12b are equally spaced from one another. As is seen from FIG. 2, upon mounting the chucking hub member 10 to the disc substrate 2, the guide ribs 12b are brought into contact with a cylindrical wall of the center opening 2a of the disc substrate 2.

Similar to the above-mentioned outer plastic ring 12, the inner plastic ring 13 is integrally molded to the inner periphery of the metal plate 11 by means of an outsert molding method. The inner plastic ring 13 defines a centering opening 13a into which a spindle (not shown) of a disc drive device is inserted.

In fact, the outer and inner plastic rings 12 and 13 and the circular metal plate 11 are integrally molded by means of a known double outsert molding method which will be described hereinafter.

The chucking hub member 10 having the above-mentioned structure is secured to the disc substrate 2 in the following manner.

That is, first, as is seen from FIG. 2, the chucking hub member 10 is concentrically put on an operative surface of the disc substrate 2 having the guide ribs 12b mated with the cylindrical wall of the center opening 2a of the disc substrate 2. Thus, under this condition, a center-positioning of the chucking hub member 10 relative to the disc substrate 2 is established. Then, an ultrasonic generating horn (not shown) is put on the outer plastic ring 12 and energized for a predetermined time. With this, the circular ridge 12a formed on the outer plastic ring 12 is welded to the disc substrate 2.

Two identical disc substrates 2 and 2, each being constructed in the above-mentioned manner, are bonded at their opposing surfaces to constitute an optical disc 1.

Upon loading the optical disc 1, the metal plate 11 of the disc 1 is attracted by the magnet on the turn table of the disc drive device and the spindle of the drive device is inserted into the centering opening 13a of the disc 1 for centering or positioning the disc 1 relative to the turn table. Under this condition, the disc 1 is properly clamped by the magnetic clamp system.

As will be seen from FIG. 2, in molding the chucking hub member 10, injection gates for the outer plastic ring 12 are located at positions 12c (only one is shown) which face the outside surface of the chucking hub member 10, while an injection gate for the inner plastic ring 13 is located at a position 13c which faces the inside surface of the chucking hub member 10. That is, the injection gates for the outer and inner plastic rings 12 and 13 are positioned at opposite sides of the chucking hub member 10. As is seen from FIG. 3, upon molding, a melted plastic for the outer plastic ring 12 is injected into a cavity of a mold through the three injection gates (12c). Because of provision of the circular ridge 12a on the inside annular surface, the injection gates for the outer plastic ring 12 must be positioned at such outside position. That is, if the gates (12c) for the outer plastic ring 12 are positioned at the inside position like in the case of the inner plastic ring 13, three cuts would be required in the circular ridge 12a. Also, provision of such cuts in the ridge 12a lowers the bonding between the chucking hub member 10 and the disc substrate 2.

Accordingly, for production of the chucking hub member 10, a troublesome step for turning over the chucking hub member (more specifically, a semi-finish chucking hub member consisting of the metal plate 11 and the outer ring 12) has to be included in the series of production steps. This will be understood from the following description when taken in conjunction with FIGS. 5a and 5b.

Figure 5A:
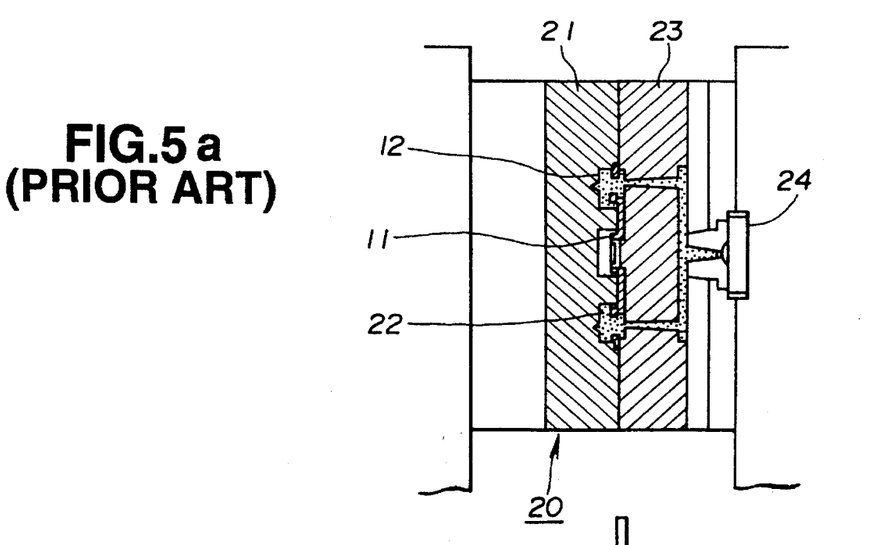
FIGS. 5a and 5b are sectional views of two mold assemblies which are used for producing or molding the conventional chucking hub member.

That is, in order to produce the above-mentioned semi-finish chucking hub member, a mold assembly 20 as shown in FIG. 5a is used, which comprises a stationary mold 23 and a movable mold 21.

For the injection molding, the circular metal plate 11 is placed in a cavity 22 of the movable mold 21 and then the two molds 21 and 23 are tightly combined. Then, by operating an injection machine 24, melted plastic is injected through runners of the stationary mold 23 into the cavity 22 for molding the outer plastic ring 12. After the melted plastic is hardened, the movable mold 21 is dismantled from the stationary mold 23, and then the produced semi-finished chucking hub member is removed from the movable mold 21.

Figure 5B:
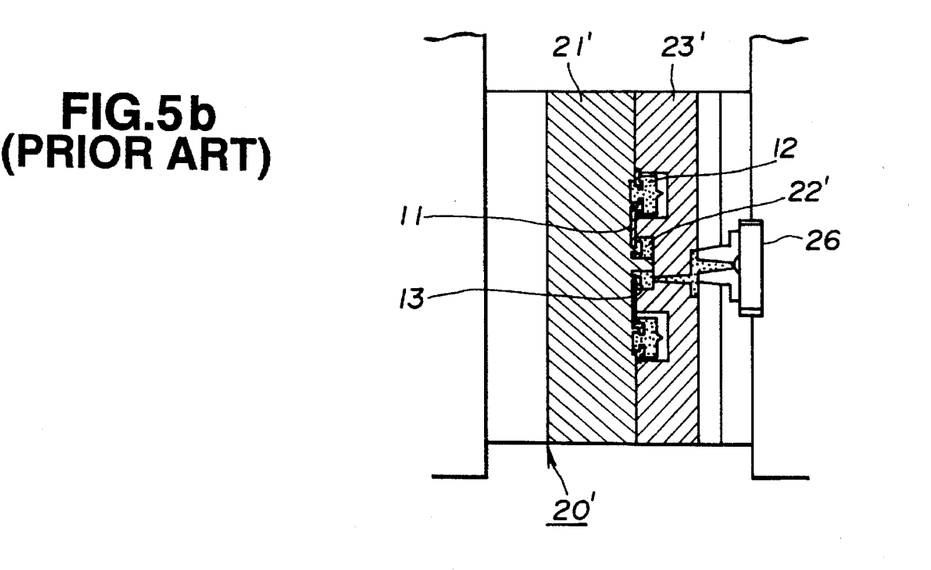

Then, another mold assembly 20' as shown in FIG. 5b is prepared, which comprises a stationary mold 23' and a movable mold 21'. The semi-finished chucking hub member is placed in a cavity 22' of the stationary mold 23' and the two molds 21' and 23' are tightly combined. Then, by operating another injection machine 26, melted plastic is injected into the cavity 22' for molding the inner plastic ring 13. After the melted plastic is hardened, the chucking hub member 10 thus consisting of the metal plate 11 and the outer and inner plastic rings 12 and 13 is removed from the mold assembly 20'.

As will be understood from the above description, in the conventional method, when the molding of the outer plastic ring 12 at the mold assembly 20 is finished, it becomes necessary to completely remove the semi-finished chucking hub member from the mold assembly 20 (more specifically, the movable mold 21) for preparation of the subsequent molding of the inner plastic ring 13 at the other mold assembly 20'. As is known, removal of the semi-finished chucking hub member from the mold assembly 20 involves troublesome and time-consumed manual labor. Furthermore, after removal from the mold assembly 20, the semi-finished chucking hub member must be turned over for proper setting in the other mold assembly 20', which makes the manual labor much harder.

SUMMARY OF THE INVENTION

It is therefore an object of the present invention to provide a recording disc having a chucking hub member secured thereto, in which the chucking hub member is easily produced.

It is another object of the present invention to provide a method of producing a chucking hub member for use with a recording disc, which method is very simple as compared with the above-mentioned conventional method.

According to a first aspect of the present invention, there is provided a recording disc including a disc substrate which has an upper surface capable of recording and/or reproducing information signals and a chucking hub member which is installed at a center portion of the disc substrate, the chucking hub member comprising a circular metal plate having a circular center opening formed therethrough; an outer plastic ring molded on and around an outer peripheral portion of the metal plate, the outer plastic ring having at its inside surface a connecting portion which is to be secured to the upper surface of the disc substrate; and an inner plastic ring molded on and around a peripheral portion of the circular center opening of the metal plate so as to provide the chucking hub member with a centering opening, wherein the outer and inner plastic rings are produced by injecting melted plastic into both a first cavity portion defined about the outer peripheral portion of the metal plate and a second cavity portion defined about the peripheral portion of the circular center opening of the metal plate, the first and second cavity portions having respective inlet openings which face toward the same direction.

According to a second aspect of the present invention, there is provided a method of producing a chucking hub member which is to be secured to a center portion of a recording disc, the chucking hub member including a circular metal plate with a circular center opening, an outer plastic ring molded on and around an outer peripheral portion of the metal plate and an inner plastic ring molded on and around a peripheral portion of the circular center opening of the metal plate. The method comprises the steps of: (a) placing the circular metal plate in a cavity of a first mold; (b) combining the first mold with a second mold so that a first plastic inlet opening defined by the first mold is mated with a first injection gate defined by the second mold; (c) injecting melted plastic into the cavity through the first injection gate and the first plastic inlet opening for molding the outer plastic ring; (d) disconnecting, when the injected plastic is hardened, the first and second molds while leaving the metal plate and the hardened outer plastic ring in the first mold; (e) combining the first mold with a third mold so that a second plastic inlet opening defined by the first mold is mated with a second injection gate defined by the third mold; and (f) injecting melted plastic into the cavity through the second injection gate and the second plastic inlet opening for molding the inner plastic ring.

According to a third aspect of the present invention, there is provided a recording disc having a disc substrate on or from which information signals are recorded or reproduced and a chucking hub member which is installed at the disc substrate, the chucking hub member comprising a circular metal plate having a center opening formed therethrough; an outer plastic ring molded on and around an outer peripheral portion of the circular metal plate, the outer plastic ring having at one surface thereof a connecting portion which is secured to the disc substrate; and an inner plastic ring molded on and around a peripheral portion of the center opening of the circular metal plate, the inner plastic ring having a center opening for achieving positioning thereof relative to a drive device, wherein plastic injection portions of the outer and inner plastic rings are both positioned at one surface of the chucking hub member.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to FIGS. 6 to 12b of the accompanying drawings.

For simplification of description, parts and constructions which are substantially the same as those of the above-mentioned conventional disc are denoted by the same numerals and detailed explanation of them will be omitted from the following description.

Figure 6:
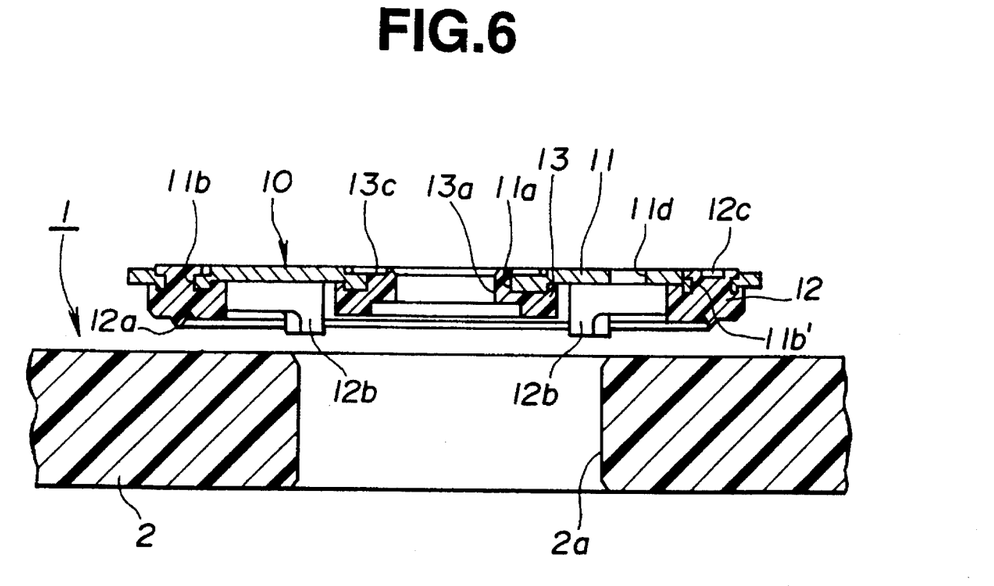
FIG. 6 is a view similar to FIG. 2, but showing an optical disc having a chucking hub member which is produced by the method of the present invention.
Figure 7:
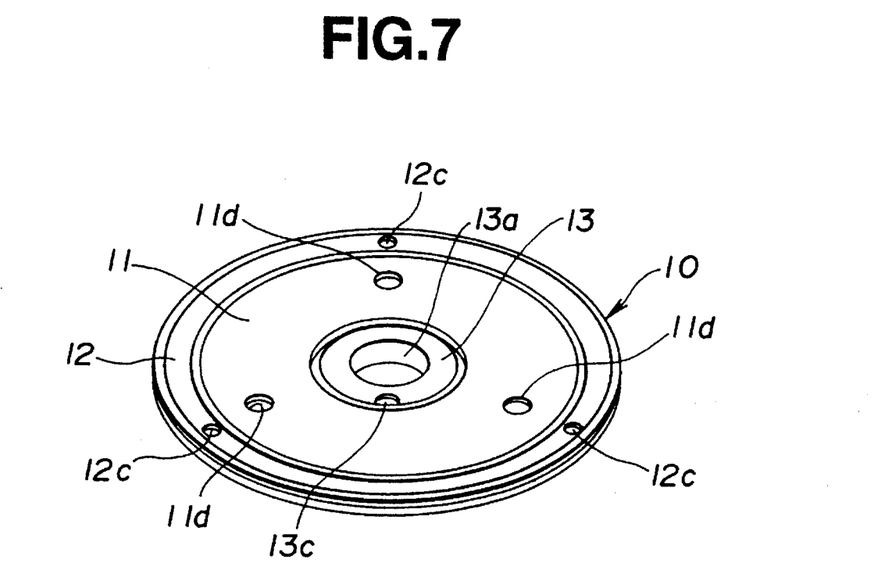
FIG. 7 is a perspective view of the chucking hub member of the invention.

Referring to FIG. 6, there is shown, but in an exploded manner, an upper half of an optical disc 1 which has two surfaces each capable of recording and reproducing information signals. Similar to the above-mentioned conventional optical disc, a chucking hub member 10 is welded to a bored center portion 2a of a disc substrate 2 by means of ultrasonic welding, and the chucking hub member 10 comprises an outer plastic ring 12, an inner plastic ring 13 and a circular magnetic metal plate 11 which is integrally molded with the outer and inner plastic rings 12 and 13 through an after-described double outsert molding method. The outer plastic ring 12 has at its inside annular surface a circular ridge 12a, and the inner plastic ring 13 has a centering opening 13a.

As will be understood from FIG. 6, in molding the chucking hub member 10, injection gates for the outer plastic ring 12 and another injection gate for the inner plastic ring 13 are both located at the same side, that is, at positions 12c (only one is shown) and 13c which face the outside surface of the chucking hub member 10.

Figure 10:
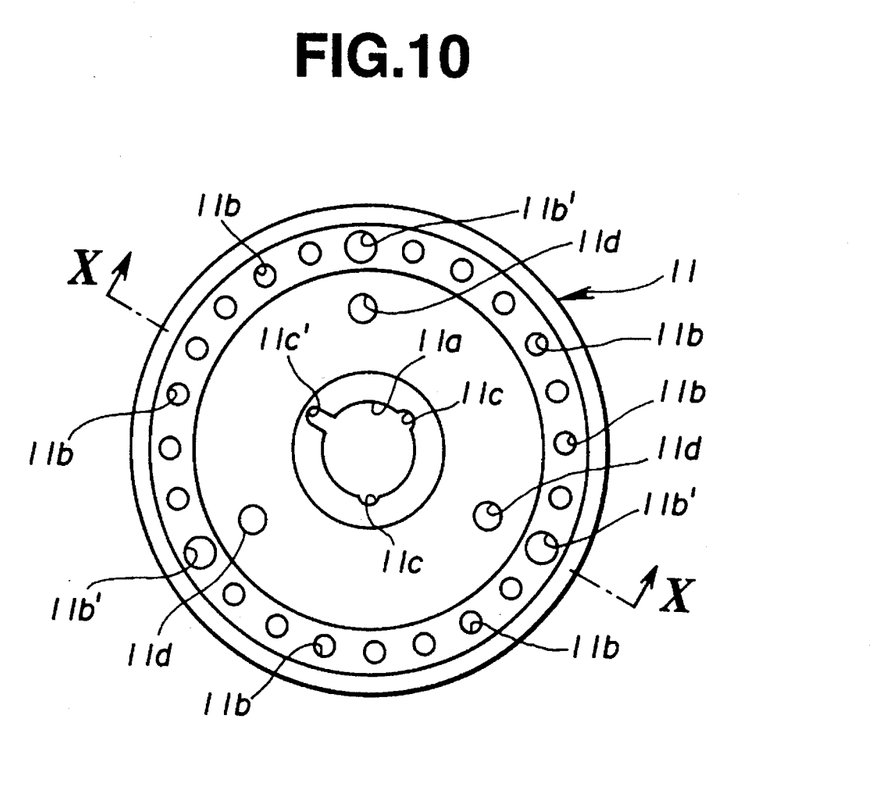
FIG. 10 is a plan view of the circular metal plate.
Figure 11:
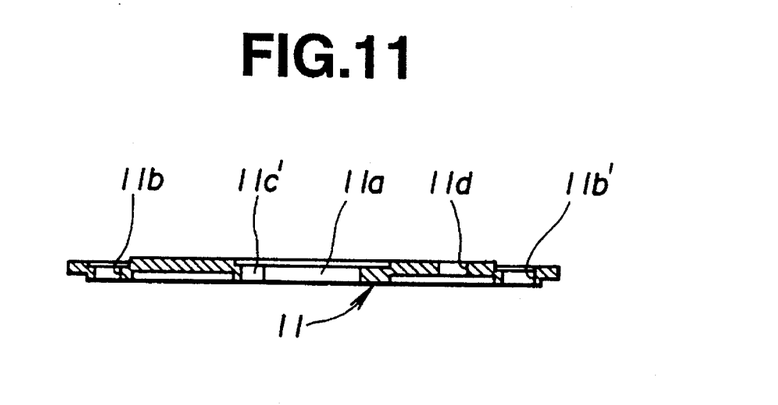
FIG. 11 is a sectional view taken along the line X—X of FIG. 10.

As is seen from FIG. 10, the circular metal plate 11 is formed at its peripheral portion with a plurality of openings 11b. Three 11b', 11b' and 11b' of them are somewhat larger than the others, which are equally spaced from one another. As will become apparent as the description proceeds, these three openings 11b', 11b' and 11b' are used as inlet bores through which melted plastic from an injection machine is injected for molding the outer plastic ring 12.

Furthermore, the circular metal plate 11 is formed at the periphery of the center opening 11a with three equally spaced cuts 11c, 11c and 11c' which are used for achieving a secured connection of the inner plastic ring 13 to the metal plate 11. These cuts 11c, 11c and 11c' are displaced from the openings 11b', 11b' and 11b' by 60 degrees in angle. One, that is the cut 11c', of the three cuts is elongated in a radial direction, which is used as an inlet bore through which melted plastic is injected for molding the inner plastic ring 13.

Figure 8A:
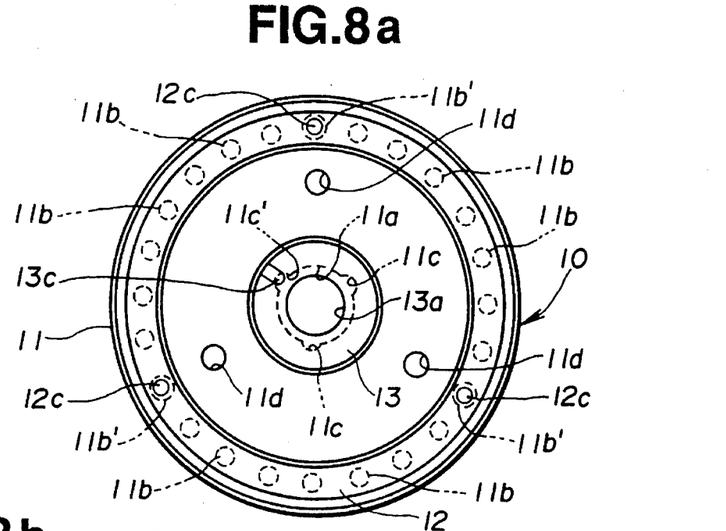
FIG. 8a is a plan view of the chucking hub member of the invention.
Figure 8B:
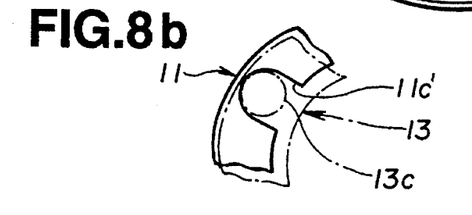
FIG. 8b is an illustration showing a positional relation between an injection gate for an inner plastic ring and a larger cut formed in a circular metal plate.
Figure 9:
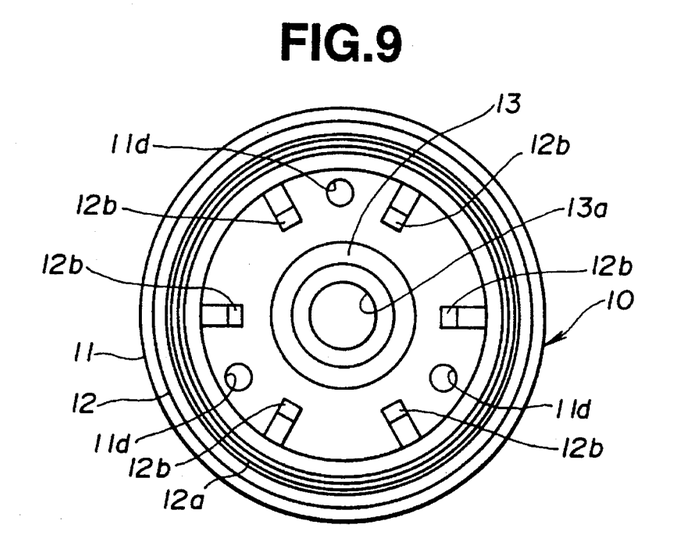
FIG. 9 is a bottom view of the chucking hub member of the invention.

As is seen from FIG. 8b, the radially elongated cut 11c' is somewhat larger than an outlet opening (13c) of the injection gate for the inner plastic ring 13. The other two cuts 11c and 11c are formed smaller than the cut 11c'. That is, if the cuts 11c and 11c are formed larger than the cut 11c', there arises a possibility that an excessive amount of melted plastic gathers at such cuts 11c and 11c thereby obstructing a smoothed flow of the melted plastic to a remote position defined between the two cuts 11c and 11c. This tends to cause undesired shrinkage of a produced inner plastic ring 13. Although the cut 11c' is formed larger, such undesired plastic gathering phenomenon does not occur because the injection pressure at the cut 11c' is very high due to close positioning of the same to the outlet opening (13c) of the injection gate.

As is seen from FIG. 10, the circular metal plate 11 is further formed at its middle portion with three equally spaced positioning openings 11d, 11d and 11d. As will become apparent hereinafter, these positioning openings are used for positioning the circular metal plate 11 relative to the mold assemblies.

In the following, the double outsert molding method for producing the chucking hub member 10 having the above-mentioned construction will be described with reference to FIGS. 12a and 12b.

In order to produce or mold the chucking hub member 10, two types of mold assemblies 20 and 20' are used. Each mold assembly comprises a stationary mold 23 or 23' and a movable mold 21, as shown.

Figure 12A:
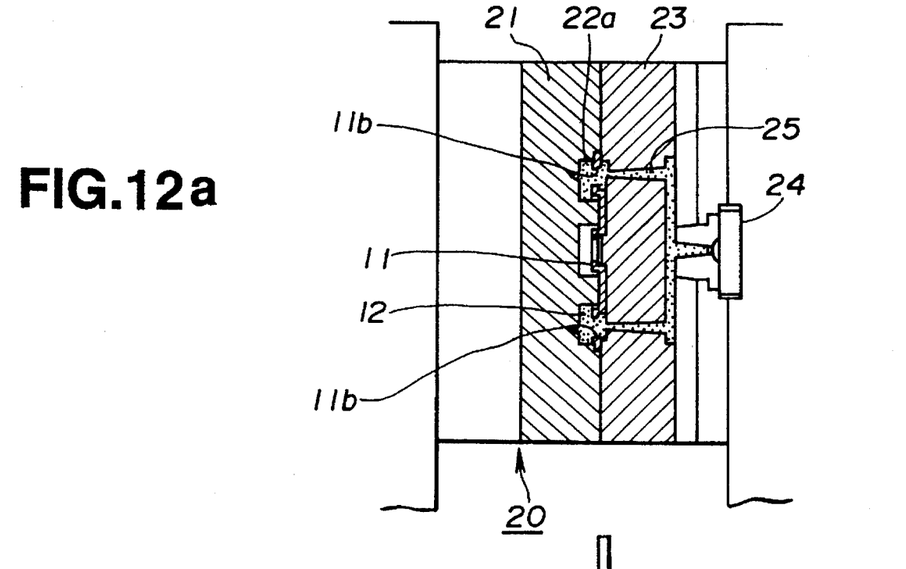
FIGS. 12a and 12b are sectional views of two mold assemblies which are used for producing or molding the chucking hub member of the invention.

First, as is seen from FIG. 12a, the circular metal plate 11 is properly placed in a cavity 22 of the movable mold 21 by mating the positioning openings 11d, 11d and 11d thereof with corresponding projections formed on the movable mold 21. Then, the two molds 21 and 23 are tightly combined in such a manner that the three larger openings 11b', 11b' and 11b' of the metal plate 11 are mated with corresponding injection gates (12c). Then, by operating an injection machine 24, melted plastic is injected through runners 25 of the stationary mold 23 into a radially outer cavity 22a for molding the outer plastic ring 12. As is understood from the drawing, the melted plastic flows into the cavity 22a through the three larger openings 11b', 11b' and 11b' of the metal plate 11.

Figure 12B:
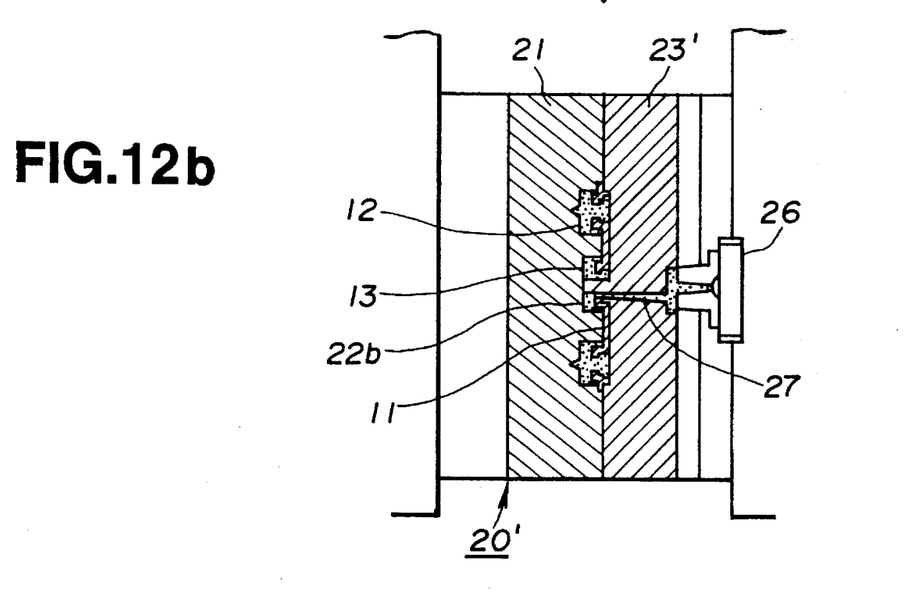

After the melted plastic is hardened, the movable mold 21 is dismantled from the stationary mold 23 and then moved to another place where the movable mold 21 is tightly combined with another stationary mold 23' as shown in FIG. 12b. During this shifting, the produced semi-finished chucking hub member remains in the movable mold 21. In the new fixed position of the movable mold 21, the larger cut 11c' is mated with an injection gate (13c). Then, by operating another injection machine 26, melted plastic is injected through a runner 27 of the stationary mold 23' into a radially inner cavity 22b for molding the inner plastic ring 13. As is understood from the drawing (viz., FIG. 12b), the melted plastic flows into the cavity 22b through the larger cut 11c'.

After the melted plastic is hardened, the movable mold 21 is dismantled from the stationary mold 23' and the finish chucking hub member 10 consisting of the circular metal plate 11 and the outer and inner plastic rings 12 and 13 is removed from the movable mold 21.

The chucking hub member 10 thus produced in the above-mentioned manner is then secured to a disc substrate 2 (see FIG. 6) in the aforementioned conventional manner. Two identical disc substrates 2, each equipped with the chucking hub member 10, are then bonded at their opposing surfaces to constitute an optical disc 1.

In the following, advantages of the present invention will be described.

(1) In the process of producing the chucking hub member 10, there is no need of removing the semi-finish chucking hub member from the movable mold 21 until it is finally molded at the other molding assembly 20'.

(2) The troublesome turn-over step for the semi-finish chucking hub member is not necessary in the production process.

(3) In the present invention, the movable mold 21 can be commonly used in both the mold assembly 20 for molding the outer plastic ring 12 and the other mold assembly 20' for molding the inner plastic ring 13.

What is claimed is:

1. A method of producing a chucking hub member which is to be secured to a center portion of a recording disc, said chucking hub member including a circular metal plate with a circular center opening, an outer plastic ring molded on and around an outer peripheral portion of said metal plate and an inner plastic ring molded on and around a peripheral portion of the circular center opening of said metal plate, said method comprising the steps of:

placing the circular metal plate in a cavity of a first mold;

combining said first mold with a second mold so that a first plastic inlet opening defined by said second mold is mated with a first injection gate defined by said first mold;

injecting melted plastic into said cavity through said first injection gate and said first plastic inlet opening to form the outer plastic ring;

disconnecting, when the injected plastic has hardened, said first and second molds while leaving the metal plate and the hardened outer plastic ring in said first mold;

combining said first mold with a third mold so that a second plastic inlet opening defined by said third mold is mated with a second injection gate defined by said first mold; and injecting melted plastic into said cavity through said second injection gate and said second plastic inlet opening to form the inner plastic ring.

2. The method according to claim 1, wherein the metal plate has a plurality of positioning openings formed therein and wherein said step of placing includes using the positioning openings to align the metal plate relative to the first mold.

3. The method according to claim 1, wherein the metal plate has a plurality of through holes formed therein and wherein said step of injecting melted plastic through said first injection gate includes injecting melted plastic into the through holes to form the outer plastic ring.

4. The method of claim 1 wherein the metal plate has a plurality of cuts formed adjacent the circular center opening and wherein said step of injecting melted plastic through said second injection gate includes injecting melted plastic into at least one of the cuts to form the inner plastic ring.

* * * * *